Jan. 29, 1929.  H. WAGENER  1,700,604

INTERNAL COMBUSTION ENGINE PISTON AND PROCESS FOR MAKING THE SAME

Original Filed Oct. 16, 1926

INVENTOR.
Hans Wagener
BY Myron J. Dikeman
ATTORNEY.

Patented Jan. 29, 1929.

1,700,604

UNITED STATES PATENT OFFICE.

HANS WAGENER, OF BERLIN-FRIEDENAU, GERMANY, ASSIGNOR, BY DIRECT AND MESNE ASSIGNMENTS, OF ONE-FOURTH TO HEINRICH MARZAHN, OF BERLIN-WILMERSDORF, GERMANY, ONE-FOURTH TO WILLIAM M. BARRY, OF DETROIT, MICHIGAN, AND ONE-FOURTH TO THEODORE C. BETZOLDT, MARVIN A. SMITH, AND FRANK J. CUSHING.

INTERNAL-COMBUSTION-ENGINE PISTON AND PROCESS FOR MAKING THE SAME.

Application filed October 16, 1926, Serial No. 141,981, and in Great Britain December 24, 1925. Renewed December 6, 1928.

My invention relates to a special structure of an engine piston comprising a copper or copper alloy head brazed into a gray iron piston body, and the process covering the construction thereof as applied to the piston.

The object of my invention is to construct a piston adapted for use in an internal combustion engine, comprising a copper head and gray iron body, so designed as to allow complete brazing of the two metals together, without injury to either of the metals, and forming a solid metal piston casting thereby.

Another object is to produce an engine piston comprised of two metals, such as copper or copper alloy head combined with a body of another metal such as gray iron or steel, and of a design capable of forming a single solid metal part by brazing the two sections together under a special process herein described.

A further object is to produce a combination copper and gray iron piston of a design for greatly reducing the expansion of the piston when subjected to extreme heat temperatures, yet to withstand the great stresses caused by the expansion and contraction of metals exposed to varying temperatures, throughout the brazed section therein.

A still further object is to provide a process applicable to engine piston construction, whereby the copper or copper alloy head may be fully and efficiently brazed to a gray iron body, and without effecting the metals of either section.

These several objects are attained in the preferred form by the construction and arrangement of parts and by the special method more fully hereinafter set forth.

Similar parts on all drawings are marked by similar numerals.

Figures 2, 4:
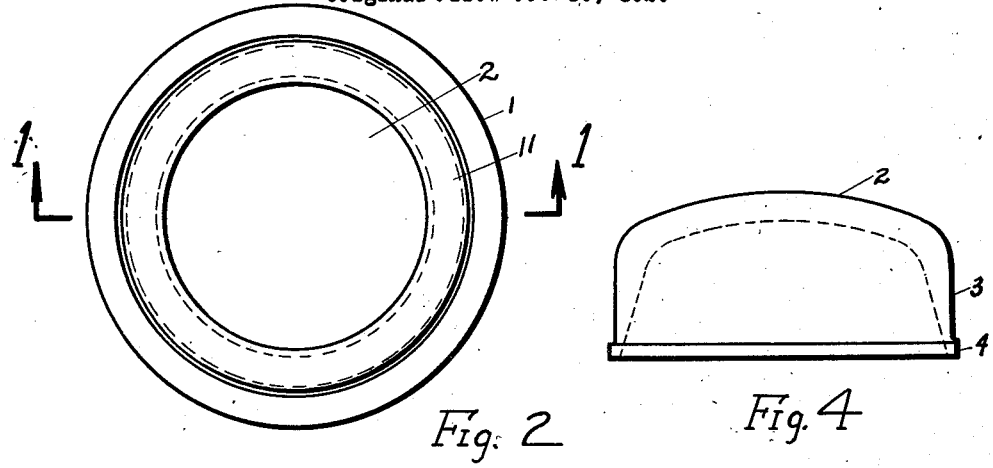
Fig. 2 is the top view of the piston showing the copper piston head in place within the gray iron piston body, and a ring of brazing material placed thereon.
Fig. 4 is a side view of the copper cap-shaped piston head showing the small retaining ring formed thereon.

I will now describe more fully the detailed construction of my piston, and the method, or process for making same, referring to the drawings and the marks thereon.

The process herein applied is more specifically set forth in another application, filed under Serial Number 141980, filed Oct. 16, 1926, and relates specifically to the brazing of copper and copper alloys to gray iron and iron alloys, while this patent includes the said process as an element of the special construction.

It is known that for internal combustion engine pistons which comprise a gray iron or steel body, and a piston head of copper or copper alloy present special advantages, as carbon deposits will not readily adhere thereto, and the expansion of the piston when exposed to high temperatures resulting from engine combustion will be greatly reduced, allowing a more closely fitted piston to be used within the engine cylinder. The general adoption of such a piston has hitherto been hampered because no good substantial connection between the copper and iron parts could be effected, or could only be produced with great difficulty and by experienced workmen, and further hampered by the fact there are incessant variations in stresses between the copper and iron sections of the piston caused by the heating and cooling of the parts, causing the connection between the copper piston head and the iron piston body to become loosened and broken.

Figure 1:
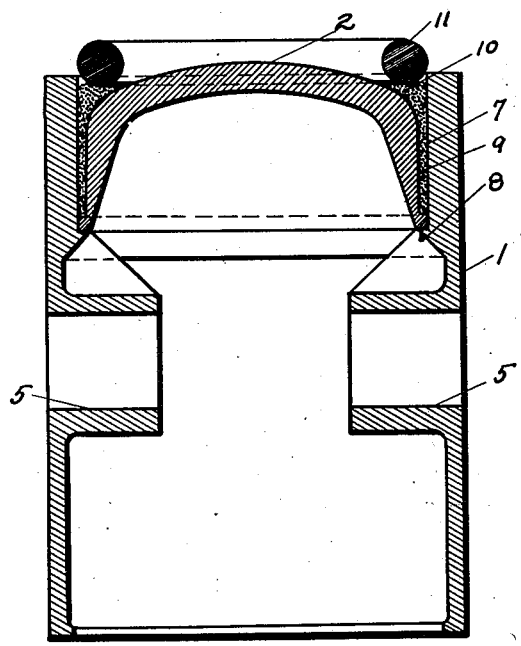
Fig. 1 represents a longitudinal section through an engine piston, as indicated by the section lines —1—1— of the Fig. 2, showing the copper head as fitted within the end recess of the gray iron piston body, and illustrates the method of fluxing and brazing the two metals together.

My method of construction overcomes these disadvantages, and produces a permanent welded connection between the copper and iron sections. In general, my invention comprises a cylindrical body, preferably made of gray cast iron or steel, and having one deep recessed end formed therein at one end of the cylinder, and a copper or copper alloy piston head fitted within the deep recessed end of the piston body. The copper piston head being formed cup-shaped, with flat, concave or convex end and having deep side walls thereon for inserting deeply within said recess, and providing an intermediate space between the walls of the piston body and the piston head for filling with soldering paste and brazing materials, for brazing and brazing the two members together. The brazing being effected by a process more fully hereinafter described. The operations necessary for carrying out the process are very simple, and can be performed safely and reliably by unskilled workmen.
The piston comprises the cylindrical iron body —1— and a deep, cup-shaped copper piston head —2— inserted and brazed therein. The head —2— is made of copper or copper alloy as may be desired, formed into a cylindrical cup-shaped member, having either a flat, concave or convex end and having a deep side flange —3— formed thereon, and is open at one end thereof. The head —2— preferably formed with a crowned end surface at one end and provided with a narrow circular collar —4— at the opposite end of the side flange —3—. The collar —4— projects from the exterior surface of the flange —3— and is positioned concentric therewith. The thickness of the material throughout the cap being varied as may be required to withstand such pressure as it may be subjected to in the various engines in which it may be used. The piston body —1—, iron, preferably gray cast-iron, or steel suitable for piston purposes, formed with cylindrical side walls having the usual piston wall designs as required to fit various types of engines, as the usual pin bearing —5— and the ring grooves —6—, and is provided with a special cylindrical recess —7— within the top end thereof. The recess —7— is made with deep cylindrical walls, and is provided with an internally projecting collar —8— formed at the bottom end thereof. The recess —7— is of a diameter to receive and fit the external collar —4— of the copper piston head —2— when the same in inserted therein, and provides means for placing the said head concentric with the piston body. The collar —4— also provides a deep open recess —9— between the walls of the copper head —2— and the iron body —1—. The internal collar —8—
of the piston body provides a temporary support for the piston head —2—, and insures a tight joint with the collar —4— for holding the liquid paste to be inserted within the recess —9—. It is essential before inserting the copper piston head —2— within the iron body —1—, that the latter be pickled by dipping same into hydrochloric acid. After the piston —2— has been inserted within the deep recess —7— of the iron body —1—, as shown in Fig. 1 of the drawings, the open recess —9— between the flange walls —3— of the head and the recess walls —7— of the body is filled up with a flux and binding medium —10—, which comprises a mixture of chemically pure iron and copper in the powdered form mixed with preferably borax, although silicon or silicon compounds may be substituted for the borax if desired, and the composition mixed with pure distilled water sufficient to make the mixture into a paste, the same being then introduced into the recess —9—, filling the said recess approximately full. The piston is then heated by any convenient means, for example by placing it in an upright position in an oven heated to about 1000 degrees centigrade. After the piston body and piston head have assumed this temperature, a solder of brass such as a brass wire solder ring —11— formed of one or more turns is placed thereon, the said ring —11— is preferably made of a diameter to just fit into the recess —9— between the piston head and the piston body. The brass solder ring melts down quickly under this temperature, and united owing to previous preparations by means of the flux and binding materials —10— in a particularly intimate manner with both the inner wall —7— of the iron piston body and the outer wall —3— of the copper or copper alloy head —2—, completely filling the gap between the two parts. The collar —4— on the copper piston head —2— prevents the molten brass solder from flowing out of the joint toward the interior of the piston. Immediately after the melting down of the brass solder ring —11— the piston must be removed from the oven and slowly cooled down, and the molten portion solidifying, brazing and joining the piston head to the piston body walls, making a solid, single brazed piece thereby. The exact proportions of the flux and brazing materials are fully set forth in a separate patent heretofore referred to.
The process of melting down the brass solder ring —11— requires but a short time, and in the ordinary case will consume only about one minute, and it is essential that immediately after the melting of the ring that the piston be removed from the oven, otherwise in consequence of the melting point of the copper and brass lying very close together the liquid brass would attack the piston head materials, and injure the piston.
The process may be carried out even by unskilled workmen, as the collar —4— of the copper head —2— always places said head in the correct position within the piston body recess, and the flux and binding materials being previously prepared, can easily be introduced within the open recess gap by means of a thin strip of sheet metal, and the melting down of the brass solder ring would intelligently indicate the moment the piston should be removed from the oven.

Figure 3:
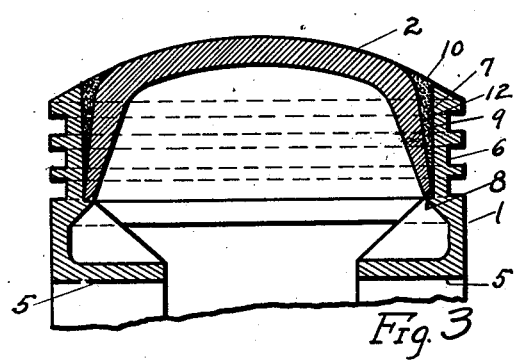
Figure 3, is a similar section to that as shown in the Fig. 1, after the brazing is completed and the piston fully machined, also illustrating an alternate form of brazing gap.

While the foregoing description of the copper piston head —2— applies to the design shown in the Figs. 1 and 4, having an external collar —4— formed thereon, an alternate form of copper head is shown in the Fig. 3, of the drawings, where the exterior collar is omitted, and the exterior flange walls conical in shape instead of the straight cylindrical walls —3— as heretofore described. The lower end of the conical flanged head fitting and engaging the interior collar —8— of the piston body —1— in the same manner as heretofore described, closing the joint therewith and providing an open recess —9— similar to the one heretofore described. The process of making the piston is exactly the same in each case.

It is evident that my invention is subject to various modifications in both mechanical design and to the soldering materials used in effecting the brazing of the joint between the copper head and the iron body, and I therefore, claim any combination that is substantially a substitution of parts and methods herein shown and described.

Having fully described my piston and method for making same, what I claim as my invention and desire to secure by Letters Patent is:

1. A piston adapted for use within an internal combustion engine, comprising a cylindrical iron piston body having a deep recess formed within one end thereof, a deep flanged copper piston head fitted within said recess of the piston body, and so designed as to provide a narrow gap between the adjoining walls of the said body and head, but closed at the bottom edge of said head wall, brazing materials inserted therein, and the said copper head securely brazed to the iron body.

2. A piston adapted for use within an internal combustion engine comprising a cylindrical gray iron body having a deep cylindrical recess formed in one end thereof, a copper piston head having deep flanged side walls fitted within said piston body recess, said copper head being so designed as to provide a narrow gap between the adjoining walls of the body and head, said gap being fully closed at the bottom edge of the head, of powdered copper and iron inserted within said gap, and the said copper head securely welded to the iron body.

3. A piston adapted for use within an internal combustion engine, comprising a cylindrical gray iron body having a deep cylindrical recess formed in one end thereof, said recess being provided with an internal projecting collar, a deep flanged copper piston head fitted deeply within said body recess and engaging the said internally projecting collar formed thereon, said copper piston head being of a design to provide a narrow gap between the adjoining walls of the body and head, said gap being closed at the bottom thereof by the contact with the internal projecting collar of the piston body, fine powdered iron and copper mixed with a binder inserted within the gap between the copper head and iron body walls, completetly filling said gap, said copper head being securely brazed to the iron body.

4. A process for manufacturing a piston comprising a copper head and an iron body having a deep end recess therein, consisting of first pickling the iron body with hydrochloric acid, then inserting the copper piston head within the deep recess of the piston body, the design of both piston head and body being such as to provide a narrow gap between the adjoining walls, but closed at the bottom edge of said gap, then filling said gap with a brazing flux and binding material, and subjecting the whole mass to a high heat temperature but less than the melting point of the copper head, flowing molten brass within the said gap, completely filling same, and allowing the said mass to cool slowly.

5. A process for manufacturing a piston having a copper head inserted within a body of other material such as gray iron having a deep end recess, consisting of first pickling the iron body with hydrochloric acid, then inserting the copper head deep within the recess of the piston body, both the said head and body being of a design to allow the assembling thereof and provide a narrow gap between the adjoining walls of said head and body, closed at the bottom edge of said gap, then packing a brazing flux and binder, comprised of fine powdered pure iron and copper mixed with borax and water forming a liquid paste within the said gap, completely filling same, then heating the whole mass to about 1000° C., then inserting a brass wire on the gap, allowing same to melt under the continued heat, said molten brass permeating the flux and completely filling the gap, immediately followed by the slow cooling of the entire mass.

6. A process for manufacturing a piston for use in an internal combustion engine, having a copper head deeply recessed within the end of the iron piston body formed with an end recess therein, consisting of first pickling the iron body with hydrochloric acid, then inserting the copper head deep within the body recess, the design of both body and head being such as will provide a narrow gap between the adjoining walls of said head and body, said gap being closed at the bottom edge thereof, then inserting a brazing flux and binding material within said gap, completely filling same, said brazing flux and binding material is comprised of powdered pure copper and iron, mixed with a binding maetrial such as borax, ground glass, silicon or ceiling paste, then subjecting the whole mass to a heat treatment of about 1000° C. but not to the actual melting point of the copper head, then inserting a brass section on top of the said gap and continue the heating process until the brass section melts, permeating the liquid flux and binding material and completely filling the gap, then allowing the mass to cool slowly.

In witness whereof I sign this specification.

HANS WAGENER.